(12) United States Patent
Tsurumi (10) Patent No.: US 10,568,151 B2
(45) Date of Patent: Feb. 18, 2020

(54) PRINTER, PRINTER CONTROL METHOD, AND COMMUNICATION SYSTEM (71) Applicant: SEIKO EPSON CORPORATION, Tokyo (JP)

(72) Inventor: Yutaka Tsurumi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 15/835,931

(22) Filed: Dec. 8, 2017

(65) Prior Publication Data
US 2018/0220475 A1 Aug. 2, 2018

(30) Foreign Application Priority Data

Feb. 2, 2017 (JP) ................ 2017-017609

(51) Int. Cl.
*H04W 76/11* (2018.01)
*H04W 12/06* (2009.01)
(Continued)

(52) U.S. Cl.
CPC ............... *H04W 76/11* (2018.02); *G06F 3/00* (2013.01); *H04L 63/102* (2013.01); *H04N 1/00* (2013.01); *H04N 1/00307* (2013.01); *H04N 1/00973* (2013.01); *H04N 1/32641* (2013.01); *H04N 1/32776* (2013.01); *H04N 1/32786* (2013.01); *H04W 12/06* (2013.01); *H04W 12/08* (2013.01); *H04W 28/18* (2013.01); *H04W 76/14* (2018.02); *H04N 2201/0082* (2013.01)

(58) Field of Classification Search
CPC ........ H04L 63/102; H04N 1/00; H04N 7/185; H04N 7/188; H04N 1/00307; H04N 1/00973; H04N 1/32786; H04W 12/06; H04W 12/08; H04W 28/18; H04W 76/11; H04W 76/14; H04W 76/15; H04W 76/23; H04W 76/34; G06F 3/1203; G06F 3/1236; G06F 3/1292
See application file for complete search history.

(56) References Cited

U.S. PATENT DOCUMENTS 6,148,190 A * 11/2000 Bugnon .................. H04W 4/90
455/404.1
10,136,317 B2 * 11/2018 Zhou ....................... H04W 4/06
(Continued)

FOREIGN PATENT DOCUMENTS

JP 2007-228419 A 9/2007

*Primary Examiner* — Dung B Huynh
(74) *Attorney, Agent, or Firm* — Global IP Counselors, LLP (57) ABSTRACT A printer includes a printer-side memory that stores first connection setting information for establishing a communication connection with one or a plurality of terminal devices, and in accordance with second connection setting information for establishing a communication connection with an access point received from the terminal device with which a communication connection has been established, a printer-side processor that establishes a communication connection with the access point, wherein when the printer-side processor determines the terminal device having a communication connection to be the terminal device connected by mistake, disconnects the communication connection with the terminal device, and changes the first connection setting information stored in the printer-side memory.

10 Claims, 6 Drawing Sheets (51) Int. Cl.
  *H04W 28/18*   (2009.01)
  *H04W 76/14*   (2018.01)
  *H04N 1/327*   (2006.01)
  *H04N 1/00*    (2006.01)
  *H04L 29/06*   (2006.01)
  *G06F 3/00*    (2006.01)
  *H04W 12/08*   (2009.01)
  *H04N 1/32*    (2006.01)

(56) References Cited

U.S. PATENT DOCUMENTS

| | | | |
|---|---|---|---|
| 2002/0004389 A1* | 1/2002 | Yi | H04L 47/10 455/452.2 |
| 2004/0201866 A1* | 10/2004 | Maekawa | G06F 3/1204 358/1.13 |
| 2006/0039305 A1* | 2/2006 | Thawani | H04L 63/0442 370/310 |
| 2006/0045272 A1* | 3/2006 | Ohaka | H04L 9/3271 380/270 |
| 2006/0200564 A1* | 9/2006 | Watanabe | G06F 3/1212 709/227 |
| 2006/0232819 A1* | 10/2006 | Kasamatsu | H04L 41/0803 358/1.15 |
| 2006/0246946 A1* | 11/2006 | Moritomo | H04W 76/10 455/557 |
| 2007/0005981 A1* | 1/2007 | Miyazawa | H04L 63/0428 713/176 |
| 2007/0201389 A1 | 8/2007 | Murayama | |
| 2008/0026788 A1* | 1/2008 | Hamada | H04W 72/02 455/552.1 |
| 2008/0275992 A1* | 11/2008 | Basty | H04W 76/10 709/227 |
| 2009/0241157 A1* | 9/2009 | Ochiai | H04L 47/724 725/118 |
| 2009/0296737 A1* | 12/2009 | Arye | H04L 45/00 370/465 |
| 2011/0063990 A1* | 3/2011 | Nogawa | H04W 76/19 370/252 |
| 2011/0202418 A1* | 8/2011 | Kempton | B60L 53/665 705/26.1 |
| 2012/0051244 A1* | 3/2012 | Nagara | H04W 8/005 370/252 |
| 2012/0083298 A1* | 4/2012 | Park | H04W 12/04 455/500 |
| 2013/0196702 A1* | 8/2013 | Shibata | H04W 76/10 455/509 |
| 2013/0201981 A1* | 8/2013 | Niwa | H04W 88/06 370/338 |
| 2013/0260674 A1* | 10/2013 | Shimada | H04W 76/10 455/39 |
| 2013/0265935 A1* | 10/2013 | Matsuda | H04W 76/10 370/315 |
| 2014/0085655 A1* | 3/2014 | Matsubara | H04N 1/00952 358/1.13 |
| 2014/0087655 A1* | 3/2014 | Hall | H04B 5/0056 455/41.1 |
| 2014/0153017 A1* | 6/2014 | Watanabe | G06F 3/1212 358/1.13 |
| 2014/0198727 A1* | 7/2014 | Ogawara | H04W 76/19 370/328 |
| 2014/0240776 A1* | 8/2014 | Suzuki | G06F 3/1296 358/1.15 |
| 2014/0364084 A1* | 12/2014 | Tomikawa | H04M 15/67 455/408 |
| 2015/0009991 A1* | 1/2015 | Sung | H04L 12/4641 370/392 |
| 2015/0293773 A1* | 10/2015 | Cai | H04L 67/28 718/1 |
| 2016/0127308 A1* | 5/2016 | Yu | H04W 52/0235 709/219 |
| 2016/0180703 A1* | 6/2016 | Chang | G08G 1/005 340/944 |
| 2016/0269962 A1* | 9/2016 | Takahashi | H04W 36/30 |
| 2016/0277997 A1* | 9/2016 | Kang | H04W 40/22 |
| 2016/0286343 A1* | 9/2016 | Terashita | H04W 4/80 |
| 2016/0302289 A1* | 10/2016 | Nishioka | H04W 76/10 |
| 2016/0360349 A1* | 12/2016 | Goto | H04W 48/16 |
| 2017/0005876 A1* | 1/2017 | Shibata | H04W 12/06 |
| 2017/0041966 A1* | 2/2017 | Asakura | H04W 76/10 |
| 2017/0063875 A1* | 3/2017 | Yanase | H04L 63/105 |
| 2017/0064756 A1* | 3/2017 | Abe | H04W 76/14 |
| 2017/0070951 A1* | 3/2017 | Takeuchi | H04W 48/20 |
| 2017/0086237 A1* | 3/2017 | Ando | H04W 8/005 |
| 2017/0094695 A1* | 3/2017 | Nishikawa | H04B 17/318 |
| 2017/0123739 A1* | 5/2017 | Konji | G06F 3/1236 |
| 2017/0127379 A1* | 5/2017 | Mayuzumi | G01S 3/801 |
| 2017/0127384 A1* | 5/2017 | Shimada | H04W 28/0205 |
| 2017/0161786 A1* | 6/2017 | Terazaki | H04W 84/20 |
| 2017/0244715 A1* | 8/2017 | Menon | H04W 12/06 |
| 2017/0303332 A1* | 10/2017 | Yuan | H04W 76/16 |
| 2017/0372055 A1* | 12/2017 | Robinson | H04W 12/06 |
| 2018/0027028 A1* | 1/2018 | Li | H04L 29/06 709/223 |
| 2018/0192446 A1* | 7/2018 | Skobov | H04W 8/005 |
| 2019/0028482 A1* | 1/2019 | Pallas | H04W 4/21 |
| 2019/0053309 A1* | 2/2019 | Araki | H04W 72/0453 |

* cited by examiner

PRINTER, PRINTER CONTROL METHOD, AND COMMUNICATION SYSTEM

BACKGROUND

1. Technical Field

The present invention relates to a printer, a printer control method, and a communication system.

2. Related Art

To date, a technique for establishing a communication connection between a terminal device and a printer is known (for example, refer to JP-A-2007-228419). JP-A-2007-228419 discloses a technique in which a printer issues a temporary PIN code to a terminal device, and the terminal device establishes a temporary communication connection with the printer in accordance with the issued temporary PIN code.

In general, the number of terminal devices that may to be connected simultaneously to a printer as described in JP-A-2007-228419 is limited. Accordingly, if a terminal device is unintentionally connected to a printer, the original terminal device that should be connected to the printer sometimes fails to connect.

SUMMARY

An advantage of some aspects of the invention is that it provides a printer that enables a user to suppress an unintentional communication connection with a terminal device.

According to an embodiment of the invention, there is provided a printer including: a memory configured to store first connection setting information for establishing a communication connection with one or a plurality of terminal devices; and in accordance with second connection setting information for establishing a communication connection with an external device received from the terminal device with which a communication connection has been established, a control section configured to establish a communication connection with the external device, wherein in a predetermined case, the control section determines the terminal device having a communication connection to be the terminal device connected by mistake, disconnects the communication connection with the terminal device, and changes the first connection setting information stored in the memory.

With the embodiment of the invention, in order to disconnect a communication connection with a terminal device determined to have mistakenly connected and to change the first connection setting information, it is possible to prevent a communication connection with a terminal device unintended by a user.

Also, with the embodiment of the invention, if the control section does not receive the second connection setting information from the terminal device with which a communication connection has been established within a certain period of time, the control section may determine the terminal device having the communication connection to be the terminal device connected by mistake, may disconnect the communication connection with the terminal device, and may change the first connection setting information stored in the memory.

With the embodiment of the invention, if the second connection setting information is not received from the terminal device with which a communication connection has been established within a certain period of time, in order to disconnect a communication connection with the terminal device and to change the first connection setting information, it is possible to prevent a communication connection with a terminal device unintended by a user.

Also, with the embodiment of the invention, the first connection setting information may include identification information of a network, the identification information including a fixed portion and a variable portion, and the control section may change the variable portion in accordance with a predetermined rule.

With the embodiment of the invention, the variable portion out of the fixed portion and the variable portion included in the identification information is changed in accordance with the predetermined rule, and thus it is possible to easily change the first connection setting information and to prevent a communication connection with a terminal device unintended by a user.

Also, with the embodiment of the invention, the first connection setting information may include authentication information for connecting to the network, and the control section may not change the authentication information.

With the embodiment of the invention, the authentication information included in the first connection setting information is not changed, and thus it is possible to prevent a communication connection with a terminal device unintended by a user and it is possible for a terminal device that should be connected in communication to rapidly establish a communication connection with the printer.

Also, with the embodiment of the invention, if an intensity of a radio wave received from the terminal device satisfies a predetermined intensity, the control section may establish a communication connection with the terminal device, whereas if the intensity of the radio wave received from the terminal device does not satisfy the predetermined intensity, the control section may not establish a communication connection with the terminal device.

With the embodiment of the invention, if an intensity of a radio wave received from the terminal device satisfies a predetermined intensity, the control section establishes a communication connection with the terminal device, whereas if the intensity of the radio wave received from the terminal device does not satisfies the predetermined intensity, the control section does not establish a communication connection with the terminal device. Accordingly, it is possible to prevent a communication connection with a terminal device unintended by a user.

According to another embodiment of the invention, there is provided a method of controlling a printer, the method including: storing first connection setting information for establishing a communication connection with one or a plurality of terminal devices and in accordance with second connection setting information for establishing a communication connection with an external device received from the terminal device with which a communication connection has been established, establishing a communication connection with the external device; and in a predetermined case, determining the terminal device having a communication connection to be the terminal device connected by mistake, disconnecting the communication connection with the terminal device, and changing the first connection setting information stored in the memory.

With the embodiment of the invention, in order to disconnect a communication connection with a terminal device determined to have mistakenly connected and to change the first connection setting information, it is possible to prevent a communication connection with a terminal device unintended by a user.

According to another embodiment of the invention, there is provided a communication system including an external device, a printer, and a plurality of terminal devices, the communication system including: the printer including a printer-side memory configured to store first connection setting information for establishing a communication connection with one or a plurality of terminal devices; and in accordance with second connection setting information for establishing a communication connection with the external device received from the terminal device with which a communication connection has been established, a printer-side control section configured to establish a communication connection with the external device, wherein in a predetermined case, the printer-side control section determines the terminal device having a communication connection to be the terminal device connected by mistake, disconnects the communication connection with the terminal device, and changes the first connection setting information stored in the memory, each of the terminal devices including a terminal device-side memory configured to store the first connection setting information and the second connection setting information, and if a communication connection with the printer is not established within a certain period of time, a terminal device-side control section configured to change the first connection setting information stored in the terminal device-side memory and to establish a communication connection with the printer in accordance with the changed first connection setting information.

With the embodiment of the invention, the printer disconnects a communication connection with a terminal device determined to have mistakenly connected and changes the first connection setting information, and if the terminal device does not establish a communication connection with the printer for a certain period of time, the terminal device changes the first connection setting information and establishes a communication connection with the printer in accordance with the changed first connection setting information. Accordingly, it is possible to prevent a terminal device unintended by a user from being connected in communication with the printer and for a terminal device that should be communication connected to reliably establish a communication connection with the printer. Also, at the time of communication connection, it is unnecessary for a user to perform the setting operation for a communication connection, and thus it is possible for the user to easily perform the setting operation at the time of communication connection.

Also, with the embodiment of the invention, the terminal device-side control section may change the first connection setting information stored in the terminal device-side memory in a shorter period than a period in which the printer-side control section changes the first connection setting information.

With the embodiment of the invention, the terminal device-side control section changes the first connection setting information stored in the terminal device-side memory in a shorter period than a period of changing the first connection setting information by the printer-side control section, and thus it is possible for a terminal device that should be connected in communication to establish a communication connection with the printer.

Also, with the embodiment of the invention, each of the terminal devices may include a setting section for setting a period for changing the first connection setting information.

With the embodiment of the invention, each of the terminal devices may include a setting section for setting a period for changing the first connection setting information, and thus it is possible for the printer to change a period of changing the first connection setting information. Accordingly, convenience of a user when a terminal device that should be connected in communication establishes a communication connection with the printer is improved.

Also, with the embodiment of the invention, the first connection setting information may include identification information of a network including a fixed portion and a variable portion, the printer-side control section may change the variable portion in accordance with a predetermined rule, and the terminal device-side control section may change the variable portion in accordance with the same predetermined rule as that of the printer-side control section.

With the embodiment of the invention, the printer-side control section may change the variable portion in accordance with a predetermined rule, and the terminal device-side control section may change the variable portion in accordance with the same predetermined rule as that of the printer-side control section, and thus it is possible for a terminal device that should be connected in communication to rapidly establish a communication connection with the printer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
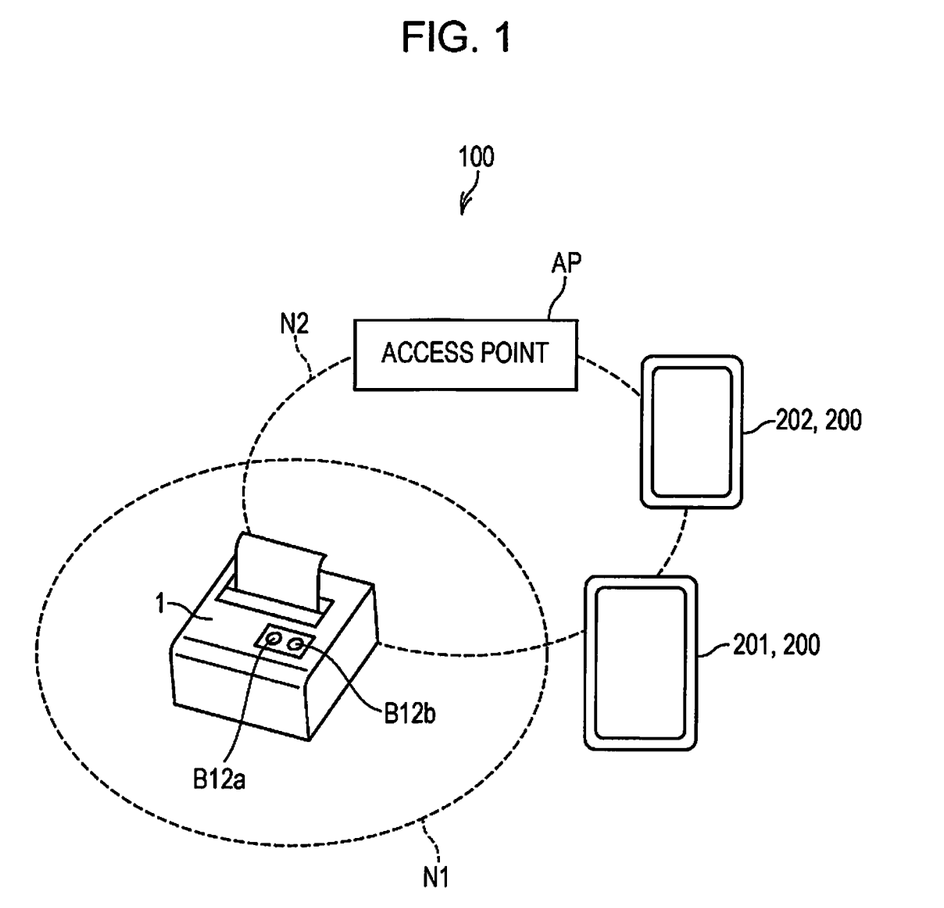
FIG. 1 is a diagram illustrating the configuration of a communication system.

FIG. 1 is a diagram illustrating the configuration of a communication system 100.

As illustrated in FIG. 1, the communication system 100 includes a printer 1 (printer), a terminal device 201, a terminal device 202, and an access point AP (external device).

The printer 1 is a device that prints characters, images, and the like on a print medium in accordance with the print data received or the print data stored by the printer 1 itself.

The terminal device 201 and the terminal device 202 are portable terminals, and are, for example, a smartphone, a tablet-type terminal, or the like. In the following description, when the terminal device 201 and the terminal device 202 are not distinguished from each other, either of the terminal devices may be described as a terminal device 200.

The access point AP is a device that relays wireless communication of devices of a wireless network N2 built on the access point AP.

The terminal device 200 and the printer 1 connect to the wireless network N2 so as to communicate with each other via the access point AP. In this regard, connecting to the wireless network N2 corresponds to establishing a communication connection with the access point AP. In this manner, the communication system 100 in a state in which the terminal device 200 and the printer 1 are capable of communicating with each other via the access point AP functions, for example, as a POS (Point Of Sale) system. A POS system is a system used for a business, such as a retail business, for example at a shopping center, a convenience store, sales aboard a train, and the like, and for a restaurant business, for example at a restaurant, a coffee shop, a pub, and the like. A POS system has functions, such as an accounting function for goods purchased by a customer and a receipt issuing function following the accounting function, and the like.

Here, a description will be given of connections to the wireless network N2 made by the printer 1 and the terminal device 200.

The access point AP that enables the wireless network N2 has network identification information for identifying the wireless network N2. In addition, the access point AP has authentication information for connecting to the wireless network N2. In the present embodiment, it is assumed that the wireless network N2 is a wireless LAN (Local Area Network) defined by IEEE802.11x. In this case, the network identification information is an SSID (Service Set Identifier) (identification information). Also, the authentication information includes a passphrase and an encryption method. A passphrase is an encryption key used for encrypting communication on a wireless LAN. For the encryption method, for example, WEP (Wired Equivalent Privacy), WPA (Wi-Fi (registered trademark) Protected Access), or encryption methods that expand or improve encryption methods upon these are provided.

When the printer 1 and the terminal device 200 connect to the wireless network N2, the printer 1 and the terminal device 200 have network information that enables these devices to be distinguished from other devices connected to the wireless network N2. The network information is unique to each device that is connected to the wireless network N2, and is, for example an IP address.

By setting the SSID and the authentication information of the access point AP in a printer-side setting file 111 described later, the printer 1 is able to connect to the wireless network N2. Also, by setting the SSID and the authentication information of the access point AP in a terminal device-side setting file 211 described later, the terminal device 200 is able to connect to the wireless network N2.

Figure 2:
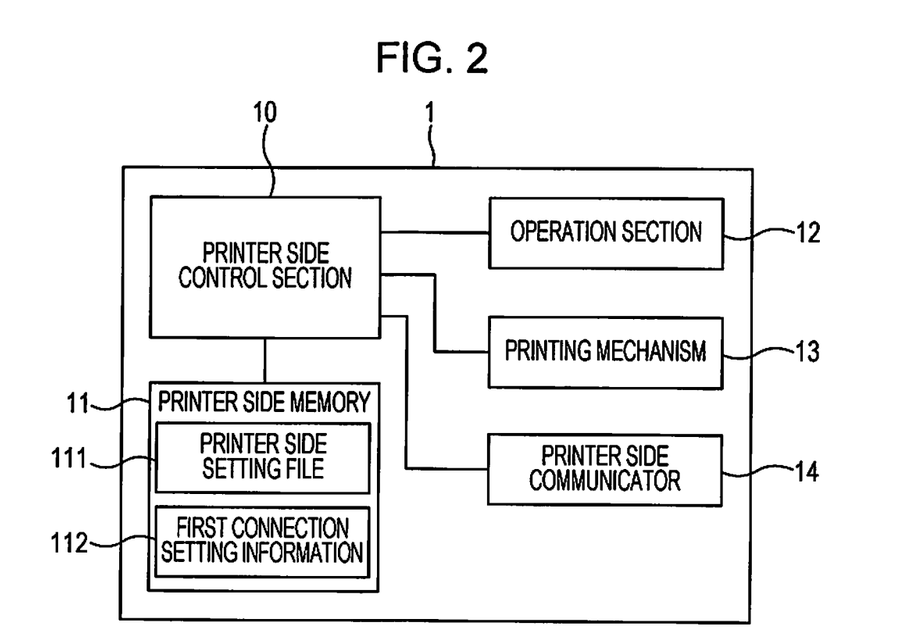
FIG. 2 is a block diagram illustrating the functional configuration of a printer.

FIG. 2 is a block diagram illustrating the functional configuration of the printer 1.

As illustrated in FIG. 2, the printer 1 includes a printer-side control section 10 (control section), a printer-side memory 11 (memory), an operation section 12, a printing mechanism 13, and a printer-side communication unit 14.

The printer-side control section 10 includes a CPU, a ROM, a RAM, and the like not illustrated in FIG. 2, and the CPU reads various programs and data stored in the ROM and executes the programs so as to control each section of the printer 1.

The printer-side memory 11 includes a nonvolatile memory, such as a hard disk, an EEPROM, or the like, and stores data in a rewritable manner. Also, the printer-side memory 11 stores the printer-side setting file 111 and first connection setting information 112. A description will be given of the first connection setting information. The printer-side setting file 111 stores combinations of a setting item regarding the setting of the printer 1 and a setting value corresponding to the setting item.

In the present embodiment, the setting items regarding the printer 1 are roughly divided into the setting items related to printing and the setting items related to communication. The setting items related to printing include setting items of the print operation of the printer 1, such as print density, print speed, and the like, and setting items related to the setting of characters and images, including margins, and the like, which are printed by the printer 1. The setting items related to communication include setting items related to the setting of communication items, such as an SSID, authentication information, IP addresses, and the like.

In the following description, a setting item in an SSID is referred to as an SSID setting item. Also, a setting item in authentication information is referred to as an authentication information setting item.

In this regard, in the present embodiment, referring to setting in the printer-side setting file 111 denotes setting a value of a predetermined setting item in the printer-side setting file 111. When referring to setting in the terminal device-side setting file 211 described later, it indicates a corresponding operation.

The operation section 12 includes operation buttons. In the present embodiment, the operation section 12 includes a power button B12a and a setting button B12b, which are illustrated in FIG. 1, as operation buttons. The power button B12a is an operation button for switching on or off the power to the printer 1. The setting button B12b is an operation button for causing the printer 1 to function as an access point in order to enable a wireless network N1.

The printing mechanism 13 includes a thermal head that forms dots on roll paper as a print medium, a transport mechanism that transport the roll paper, and a cutting mechanism that cuts the roll paper, and the like. The printing mechanism 13 forms dots on the roll paper while transporting the roll paper under the control of the printer-side control section 10 so as to record images. The printing mechanism 13 cuts the roll paper at a predetermined position under the control of the printer-side control section 10 so as to issue a piece of paper on which characters, images, and the like have been printed.

The printer side communication unit 14 performs wireless communication in accordance with a predetermined wireless communication standard under the control of the printer-side control section 10. In the present embodiment, the printer side communication unit 14 includes two modes, namely a first print communication mode and a second print communication mode as operation modes.

The printer side communication unit 14 in the first print communication mode causes the printer 1 to function as an access point that builds the wireless network, and directly (bypassing the access point AP) performs wireless communication with one or a plurality of terminal devices 200 connected to the wireless network N1. In this regard, connecting to the wireless network N1 corresponds to establishing a communication connection with the printer 1.

In the following description, an SSID that identifies the wireless network N1 is referred to as a first SSID. Also, authentication information for connecting to the wireless network N1 is referred to as first authentication information. A first SSID and first authentication information are included in the first connection setting information 112, and the first connection setting information 112 is stored in the printer-side memory 11 as illustrated in FIG. 2. In the following description, a first print SSID included in the first connection setting information is referred to as a first print SSID, and the first authentication information included in the first connection setting information is referred to as first print authentication information. In this regard, the first print SSID is an SSID of the wireless network N1.

The printer side communication unit 14 in the second print communication mode performs communication in accordance with the standards related to the access point AP and the wireless LAN. In the second print communication mode, a setting value indicating the SSID of the wireless network N2 built on the access point AP is set in the SSID setting item of the printer-side setting file 111. Also, in the second print communication mode, a setting value indicating the authentication information for establishing a communication connection to the wireless network N2 built on the access point AP is set in the authentication information setting item of the printer-side setting file 111.

In the following description, an SSID that identifies the wireless network N2 is referred to as a second SSID. Also, authentication information of the wireless network N2 built on the access point AP is referred to as second authentication information.

Next, a description will be given of the terminal device 200.

Figure 3:
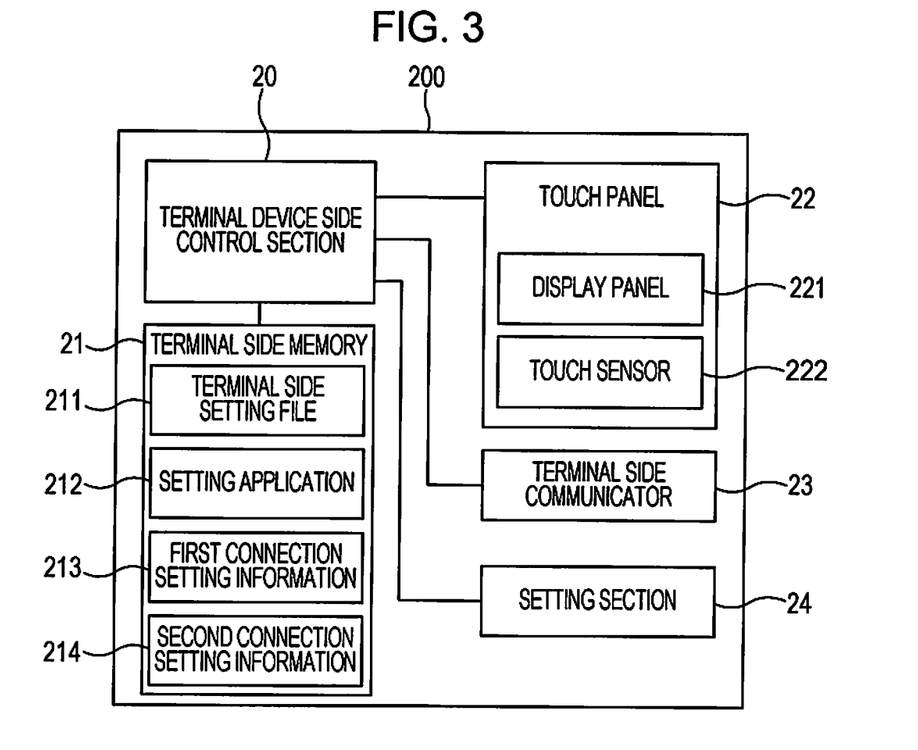
FIG. 3 is a block diagram illustrating the functional configuration of a terminal device.

FIG. 3 is a block diagram illustrating a functional configuration of the terminal device 200.

As illustrated in FIG. 3, the terminal device 200 includes a terminal device-side control section 20, a terminal device-side memory 21, a touch panel 22, a terminal device-side communication unit 23, and a setting section 24.

The terminal device-side control section 20 includes a CPU, ROM, RAM, and the like, none of which are illustrated, and the CPU reads various programs and data that are stored in the ROM and executes the programs so as to control each section of the terminal device 200.

The terminal device-side memory 21 includes a nonvolatile memory, such as a hard disk, an EEPROM, or the like, and stores data in a rewritable manner. Also, the terminal device-side memory 21 stores a terminal device-side setting file 211, a setting application 212, first connection setting information 213, and second connection setting information 214.

The terminal device-side setting file 211 stores combinations of a setting item related to the terminal device 200 and a setting value corresponding to the setting item. The setting item related to the terminal device 200 includes an SSID setting item, an authentication information setting item, a setting item of an IP address set for the local terminal device 200, and the like.

The setting application 212 is an application for performing an operation, such as configuring an initial setting, modifying a setting, and the like of the printer 1, and provides a user interface related to, for example an initial setting, a setting modification, and the like. In the present embodiment, the terminal device 200, in which the setting application 212 has been started, transmits second connection setting information described later to the printer 1. In this regard, an initial setting is a setting configured for the first time for the printer 1 that is performed by the terminal device 200 when the printer 1 is first connected to the communication system 100.

The first connection setting information 213 is information including a first SSID and first authentication information. In the following description, a first SSID included in the first connection setting information 213 is referred to as the first terminal SSID, and the first authentication information included in the first connection setting information 213 is referred to as first terminal authentication information.

The second connection setting information 214 is information including a second SSID and second authentication information.

The touch panel 22 includes a display panel 221 and a touch sensor 222. The display panel 221 is formed of a liquid crystal display, an EL (Electro Luminescent) display, or the like and displays various kinds of information under the control of the terminal device-side control section 20. The touch sensor 222 is disposed so as to overlap the display panel 221, detects a touch operation by a user, and outputs the touch operation to the terminal device-side control section 20.

The terminal device-side communication unit 23 performs wireless communication in accordance with a predetermined wireless communication standard under the control of the terminal device-side control section 20. The terminal device-side communication unit 23 has two operation modes, namely a first terminal communication mode and a second terminal communication mode.

The terminal device-side communication unit 23 in the first terminal communication mode performs communication with the printer 1 that functions as an access point in accordance with a wireless LAN standard. In the first terminal communication mode, a setting value indicating the first terminal SSID is set in the SSID setting item of the terminal device-side setting file 211. Also, in the first terminal communication mode, a setting value indicating the first terminal authentication information is set in the authentication information setting item of the terminal device-side setting file 211.

The terminal device-side communication unit 23 in the second terminal communication mode performs communication with the access point AP in accordance with a wireless LAN standard. In the second terminal communication mode, a setting value indicating the second SSID is set in the SSID setting item of the terminal device-side setting file 211. Also, in the second terminal communication mode, a setting value indicating the second authentication information is set in the authentication information setting item of the terminal device-side setting file 211.

The setting section 24 sets a period for changing the first terminal SSID, and a detailed description thereof will be given later.

As described above, in order for the printer 1 to connect to the wireless network N2 built on the access point AP and to establish a communication connection with the access point AP, the printer 1 sets the second SSID and the second authentication information in the printer-side setting file 111. However, sometimes, for example when a connection to the wireless network N2 is established for the first time from another wireless network, the printer 1 does not have the second connection setting information. In this case, it is not possible for the printer 1 to set the second SSID and the second authentication information in the printer-side setting file ill. That is to say, it is not possible for the printer 1 to connect to the wireless network N2 and establish a communication connection with the access point AP. Thus, the printer 1 functions as an access point that enables the wireless network N1, establishes a communication connection with the terminal device 200 in which the setting application 212 has been started, and receives the second connection setting information from the terminal device 200. By doing this, it is possible for the printer 1 to set the second SSID and the second authentication information in the printer-side setting file 111 and to establish a communication connection with the access point AP.

In general, when the printer 1 functions as an access point, there is a limitation on the number of terminal devices 200 capable of connecting to the wireless network N1. Accordingly, even if the printer 1 functions as an access point in order to receive the second connection setting information, due to the fact that a terminal device 200 unintended by a user is connecting to the wireless network N1, a terminal device 200 in which the setting application 212 has been started sometimes fails to connect to the wireless network N1. In other words, when setting a connection for the wireless network N2 of the printer 1, the terminal device 200 (the terminal device 200 in which the setting application 212 has been started) that should have a communication connection with the printer 1 sometimes fails to establish a communication connection with the printer 1.

For example, it is assumed that the terminal device 201 is a terminal device 200 in which the setting application 212 has been started, and the terminal device 202 is a terminal device 200 in which the setting application 212 has not been started. Also, when the printer 1 functions as an access point, it is assumed that only a single terminal device is capable of connecting to the wireless network N1. In this case, if the terminal device 202 had a previous communication connection with the wireless network N1, when the printer 1 functions as an access point, there is a possibility that the terminal device 202 will connect to the wireless network N1 before the terminal device 201. When the terminal device 202 connects to the wireless network N1 before the terminal device 201, because only one terminal device may establish a communication connection with the wireless network N1, it is not possible for the terminal device 201 to connect to the wireless network N1. Accordingly, it is not possible for the printer 1 to establish a communication connection with the terminal device 201 in which the setting application 212 has been started, to connect to the wireless network N2 built on the access point AP, or to establish a communication connection with the access point AP.

Thus, the printer 1 and the terminal device 200 that are included in the communication system 100 according to the present embodiment perform the operation as described below.

A description will be given below of the operation of the printer 1 in the case of a setting for establishing a communication connection with the access point AP.

Also, in the description of the operation of the terminal device 200, it is assumed that of the terminal device 201 and the terminal device 202 illustrated in FIG. 1, the terminal device 201 is a terminal device in which the setting application 212 has been started, and the terminal device 202 is a terminal device in which the setting application 212 has not been started. That is to say, in the setting for the printer 1 establishing a communication connection with the access point AP, the terminal device 201 is a terminal device that should establish a communication connection with the printer 1.

Also, when the printer 1 functions as an access point, it is assumed that the number of terminal devices that are capable of establishing a communication connection with the printer 1 is one, in other words, only a single terminal device is capable of connecting to the wireless network N1.

Figure 4:
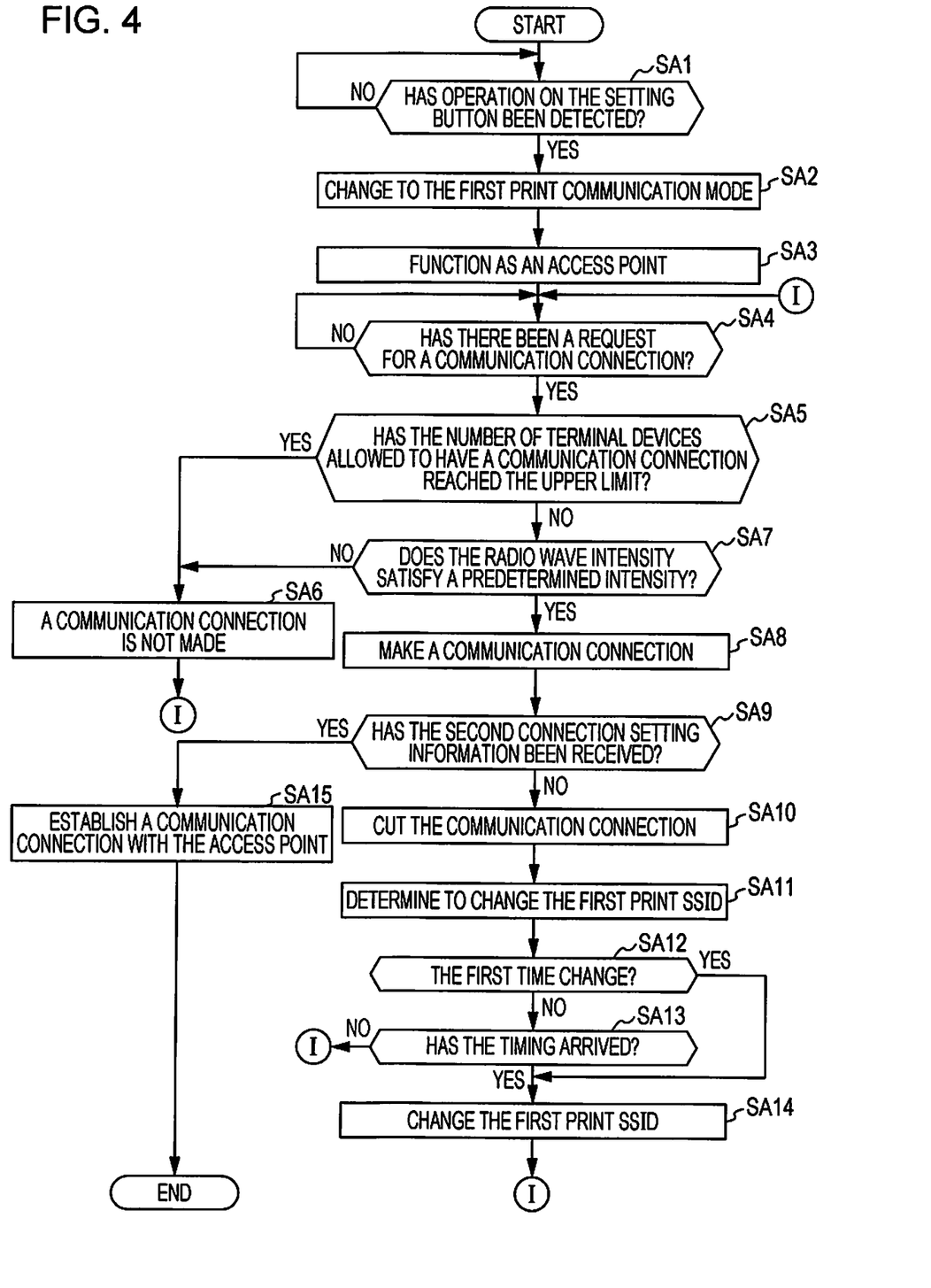
FIG. 4 is a flowchart illustrating operation of the printer.

FIG. 4 is a flowchart illustrating operation of the printer 1.

The printer-side control section 10 of the printer 1 determines whether or not the operation section 12 has detected operation of the setting button 12b by the user (step SA1). If the printer-side control section 10 determines that the operation section 12 has detected operation of the setting button 12b by the user (step SA1: YES), the printer-side control section 10 changes the operation mode of the printer side communication unit 14 to the first print communication mode (step SA2).

With the change of the operation mode of the printer side communication unit 14 to the first print communication mode, the printer-side control section 10 causes the printer 1 to function as an access point that constitutes the wireless network N1 (step SA3).

A user causes the printer 1 that sets a communication connection to the access point AP to function as an access point and then operates the terminal device 201 to establish a communication connection with the printer 1 so as to instruct the setting application 212 to start in the setting.

Figure 5:
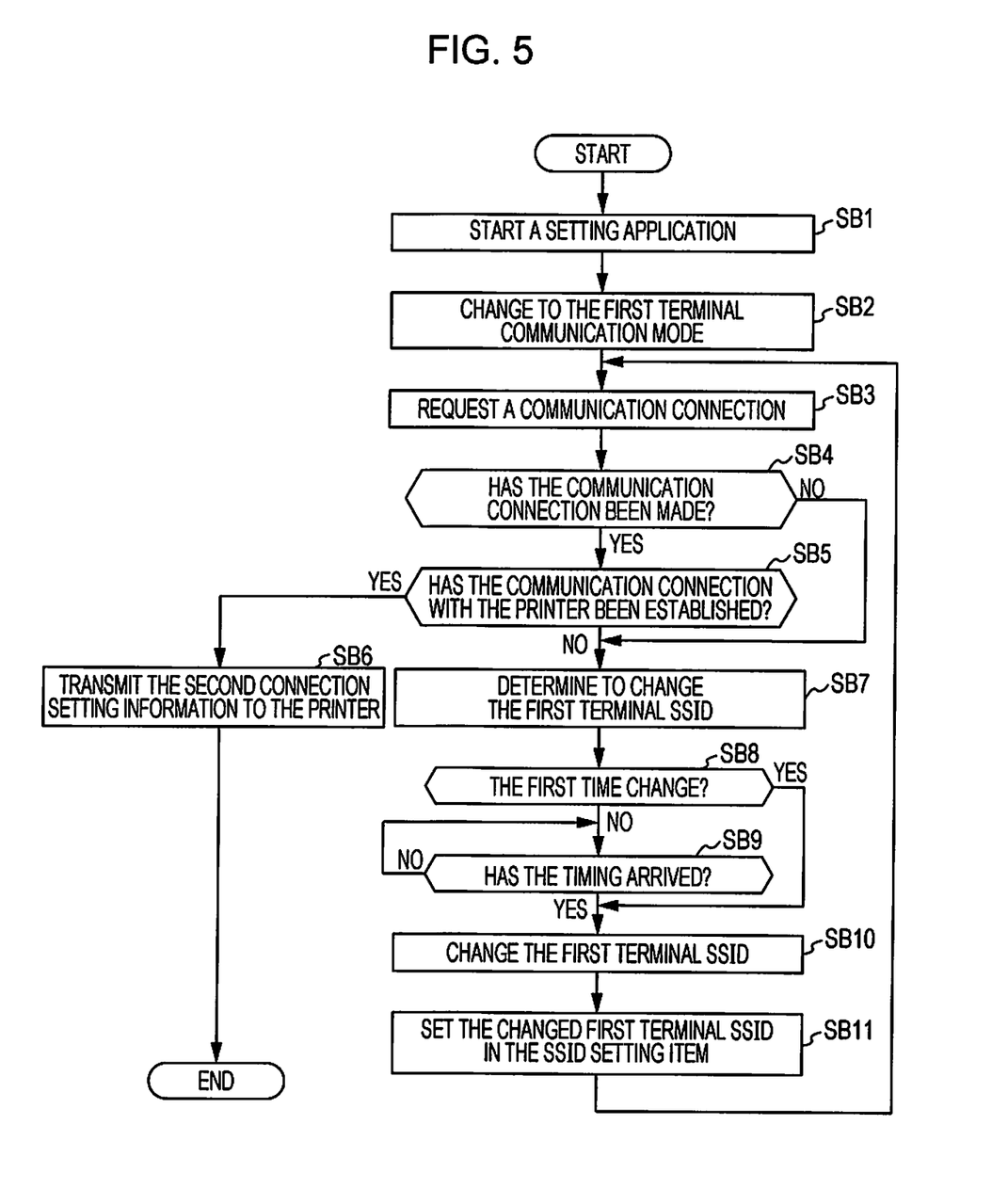
FIG. 5 is a flowchart illustrating operation of the terminal device.

FIG. 5 is a flowchart illustrating operation of the terminal device 200. In particular, in the present embodiment, operation of the terminal device 200, illustrated in FIG. 5, denotes operation of the terminal device 201 that should establish a communication connection with the printer 1 of the access point AP of the printer 1 in the setting.

The terminal device-side control section 20 of the terminal device 201 starts the setting application 212 in response to an instruction by the user (step SB1). In this regard, the processing of step SB2 and subsequent processing is performed by the function of the setting application 212 that has been started in step SB1.

After the setting application 212 is started, the terminal device-side control section 20 of the terminal device 201 changes the operation mode of the terminal device-side communication unit 23 of the terminal device 201 to the first terminal communication mode (step SB2).

Next, the terminal device-side control section 20 of the terminal device 201 makes a request to establish a communication connection with the printer 1 (step SB3). Next, the terminal device-side control section 20 of the terminal device 201 determines whether or not a request to establish a communication connection with the printer 1 has been made (step SB4). If the terminal device-side control section 20 of the terminal device 201 determines that a request to establish a communication connection with the printer 1 has not been made (step SB4: NO), the processing in step SB7 is performed, whereas if it is determined that a request to establish a communication connection with the printer 1 has been made (step SB4: YES), the processing in step SB5 is performed. In this regard, if the first terminal SSID set in the SSID setting item of the terminal device-side setting file 211 matches the first print SSID that identifies the wireless network N1, it is possible for the terminal device-side control section 20 of the terminal device 201 to make a communication connection to the printer 1, whereas if the first terminal SSID and the first print SSID differ, it is not possible to make a communication connection to the printer 1.

Referring back to the operation of the printer 1, when the printer 1 functions as an access point, the printer-side control section 10 determines whether or not there has been a request for a communication connection (step SA4).

Next, if there has been a request for a communication connection (step SA4: YES), the printer-side control section 10 determines whether or not the number of terminal devices 200 having a communication connection with the printer 1 that functions as an access point has reached the upper limit (step SA5).

If it is determined that the number of terminal devices 200 which have established a communication connection with the printer 1 that functions as an access point has reached the upper limit (step SA5: YES), the printer-side control section 10 does not establish a communication connection with the terminal device 200 that has requested a communication connection (step SA6).

On the other hand, if it is determined that the number of terminal devices 200 having a communication connection with the printer 1 that functions as an access point has not reached the upper limit (step SA5: NO), the printer-side control section 10 determines whether or not the intensity of the radio wave of the terminal device 200 that has made a request for a communication connection satisfies a predetermined intensity (step SA7). In this regard, as a method of detecting the intensity of the radio wave of the terminal device 200, the following method is given. That is the method of determining the received radio wave intensity in stages in accordance with a plurality of reference values that are set in advance, and the value indicating the determined step is regarded as the detected radio wave intensity. In this regard, this method is only an example, and any method for detecting the intensity of the radio wave of the terminal device 200 may be employed.

If the printer-side control section 10 determines that the intensity of the radio wave of the terminal device 200 that has made a communication connection does not satisfy the predetermined intensity (step SA7: NO), the printer-side control section 10 does not make a communication connection with the terminal device 200 (step SA6). On the other hand, if the printer-side control section 10 determines that the intensity of the radio wave of the terminal device 200 that has made a communication connection satisfies the predetermined intensity (step SA7: YES), the printer-side control section 10 makes a communication connection with the terminal device 200 (step SA8). A description will be given later of the advantages of making a communication connection with the terminal device 200 in accordance with the intensity of the radio wave of the terminal device 200 that has made a communication connection.

Next, the printer-side control section 10 determines whether or not the second connection setting information has been received from the terminal device 200 that made a communication connection within a certain period of time after the communication connection has been made (step SA9).

If the printer-side control section 10 determines that second connection setting information has not been received from the terminal device 200 that made a communication connection within a certain period of time after the communication connection has been made (step SA9: YES), the printer-side control section 10 determines that the terminal device 200 is a terminal device 200 that has been connected by mistake, and disconnects the communication connection (step SA10).

For example, if the terminal device 202 has established a communication connection with the printer 1 before the terminal device 201, the printer-side control section 10 determines that the terminal device 202 is a terminal device that has been connected by mistake, and the printer-side control section 10 disconnects the communication connection with the terminal device 202. This is because the terminal device 202 has not started the setting application 212, and the terminal device 202 has not transmitted the second connection setting information.

After the printer-side control section 10 disconnects the communication connection with the terminal device 200 that has not transmitted the second connection setting information within a certain period of time after making a communication connection, the printer-side control section 10 determines to change the first print SSID of the wireless network N1 (step SA11). After the printer-side control section 10 determines to change the first print SSID, the printer-side control section 10 determines whether or not the printer 1 changes the first print SSID for the first time after the printer 1 functions as an access point (step SA12).

If the printer-side control section 10 determines that the printer 1 changes the first print SSID for the first time after the printer 1 functions as an access point (step SA12: YES), the printer-side control section 10 changes the first print SSID (step SA14). On the other hand, if the printer-side control section 10 determines that the printer 1 changes the first print SSID not for the first time after the printer 1 functions as an access point (step SA12: NO), the printer-side control section 10 determines whether or not the timing to change the first print SSID has come (step SA13).

In step SA13, if a predetermined period of time elapsed after the previous change of the first SSID, the printer-side control section 10 determines that the timing to change the first print SSID has come. If the printer-side control section 10 determines that the timing to change the first print SSID has not come (step SA13: NO), the processing returns to step SA4, whereas if determined that the timing has come (step SA3: YES), the printer-side control section 10 changes the first print SSID (step SA14).

Here, a description will be given of a change of the first SSID.

Figure 6:
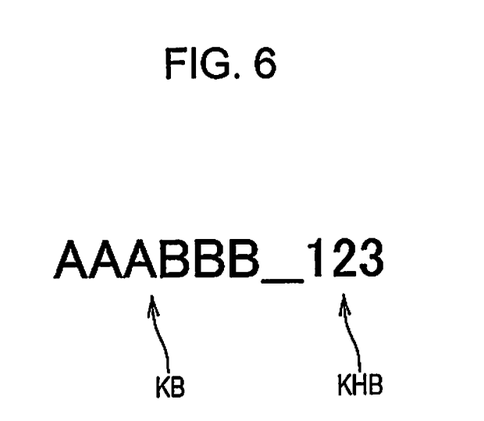
FIG. 6 is a diagram illustrating an example of a first SSID.

FIG. 6 is a diagram illustrating an example of the first SSID.

The first SSID in the present embodiment includes a fixed portion KB and a variable portion KHB. The fixed portion KB is a portion not to be changed when the first SSID is changed. The variable portion KHB is a portion to be changed when the first SSID is changed. In the case of the first SSID illustrated in FIG. 6, out of "AAABBB_123" indicating the first SSID, "AAABBB" is the fixed portion KB and "123" is the variable portion KHB.

In step SA14, when the printer-side control section 10 changes the first print SSID, the printer-side control section 10 changes the variable portion KHB of the first print SSID in accordance with a predetermined rule. The predetermined rule is, for example a rule in which when the variable portion KHB is a three-digit number as illustrated in FIG. 6, the number is incremented by one. In the case of this rule, when the first print SSID is a first SSID illustrated in FIG. 6, the printer-side control section 10 changes "AAABBB_123", which is the first print SSID, to "AAABBB 124".

After the printer-side control section 10 changes the first print SSID, the processing returns to step SA3, and the printer-side control section 10 causes the printer 1 to function as an access point for building the wireless network N1 having the changed first print SSID.

In this manner, the printer-side control section 10 disconnects a communication connection with the terminal device 200 determined to have been mistakenly connected, and changes the first connection setting information 112 stored in the printer-side memory 11. More specifically, the printer-side control section 10 changes the first print SSID included in the first connection setting information. For example, if the terminal device 202 establishes a communication connection with the printer 1 prior to the terminal device 201, the printer-side control section 10 does not receive the second connection setting information 214 from the terminal device 202, and thus the printer-side control section 10 disconnects the communication connection with the terminal device 202 and changes the first print SSID.

As described above, in the descriptions of the operation of the printer 1 and the terminal device 200, it is assumed that the terminal device 201 is a terminal device that should have a communication connection with the printer 1 in the setting for the printer 1 to establish a communication connection with the access point AP. Accordingly, the terminal device 202 corresponds to a terminal device unintended by a user in the setting for the printer 1 to establish a communication connection with the access point AP.

That is to say, as described above, the printer-side control section 10 disconnects the communication connection with the terminal device 202 and changes the first print SSID, and thus it is possible to prevent the terminal device 202 unintended by a user from establishing a communication connection with the printer 1. In this regard, the printer-side control section 10 does not change the first print authentication information of the first connection setting information 112. A description will be given later of the advantages of this. Incidentally, in some cases, when the terminal device 200 had connected to the wireless network N1 in the past and had established a communication connection with the printer 1, the terminal device 200 stores the first connection setting information. Accordingly, when the terminal device 200 encounters the wireless network N1, terminal device 200 is sometimes automatically connected to the wireless network N1. If such a terminal device 200 is the terminal device 202, the terminal device 202 is sometimes automatically connected to the wireless network N1 prior to the terminal device 201. That is to say, the terminal device 202 unintended by a user sometimes establishes a communication connection with the printer 1 by mistake. Thus, the printer-side control section 10 disconnects the communication connection with the terminal device 202 and changes the first print SSID. Accordingly, it is possible to prevent the terminal device 202 unintended by the user, which has automatically established a communication connection with the printer 1 by mistake, from establishing a communication connection with the printer 1 once again.

Also, as described above, if the intensity of the radio wave of the terminal device 200 that requests a communication connection satisfies a predetermined intensity, the printer-side control section 10 makes a communication connection, whereas if the intensity of the radio wave does not satisfies the predetermined intensity, the printer-side control section 10 does not make a communication connection. Thereby, it is possible for the printer-side control section 10 to reliably prevent the terminal device 200 unintended by a user from establishing a communication connection with the printer 1. For example, it is assumed that the terminal device 202 is located farther than the terminal device 201 from the printer 1. Incidentally, when setting a communication connection to the access point AP for the printer 1, there is a high probability that the terminal device 201 that should have a communication connection with the printer 1 is located near the printer 1. Also, in general, the intensity of the radio wave of the terminal device 20 received by the printer 1 becomes weaker as the location of the terminal device 200 is farther from the printer 1. That is to say, the intensity of the radio wave of the terminal device 202 received by the printer 1 is lower than the intensity of the radio wave of the terminal device 201. Thus, if the intensity of the radio wave of the terminal device 200 that requests a communication connection satisfies a predetermined intensity, the printer-side control section 10 makes a communication connection, whereas if the intensity of the radio wave of the terminal device 200 does not satisfies the predetermined intensity, the printer-side control section 10 does not make a communication connection so as to reliably prevent the terminal device 202 unintended by a user from establishing a communication connection from the printer 1.

Referring back to the description of the operation of the terminal device 201, if the terminal device-side control section 20 of the terminal device 201 determines that a request for a communication connection has been made (step SB4: YES), the terminal device-side control section 20 determines whether or not a communication connection has been established with the printer 1 within a certain period after the request for the communication connection to the printer 1 was made (step SB5).

As described above, if the number of terminal devices 200 having a communication connection with the printer 1 that functions as an access point has reached the upper limit, the printer-side control section 10 of the printer 1 does not make a communication connection with the terminal device 200 that has requested a communication connection. Also, if the intensity of the radio wave of the terminal device 200 that has made a communication connection does not satisfy a predetermined intensity, the printer-side control section 10 of the printer 1 does not make a communication connection with the terminal device 2 that requested a communication connection. Accordingly, in such a case, the terminal device-side control section 20 of the terminal device 201 determines that a communication connection has not been established with the printer 1 (step SB5: NO).

If the terminal device-side control section 20 of the terminal device 201 determines that a communication connection has not been established with the printer 1 in step SB5 (step SB5: NO), the terminal device-side control section 20 determines to change the first terminal SSID set in the SSID setting item of the terminal device-side setting file 211 (step SB7).

Next, after the terminal device-side control section 20 determines to change the first terminal SSID, the terminal device-side control section 20 determines whether or not the first terminal SSID is to be changed for the first time after the setting application 212 was started (step SB8).

If the terminal device-side control section 20 determines that the first terminal SSID is to be changed for the first time after the setting application 212 was started (step SB8: YES), the terminal device-side control section 20 changes the first terminal SSID (step SB10). On the other hand, if the printer-side control section 10 determines that the first terminal SSID is not to be changed for the first time after the setting application 212 was started (step SB8: NO), the printer-side control section 10 determines whether or not the timing to change the first terminal SSID has come (step SB9).

In step SB9, if a predetermined period of time has elapsed from the previous change of the first terminal SSID, the terminal device-side control section 20 determines that the timing to change the first terminal SSID has come. If the terminal device-side control section 20 has determined that the timing to change the first terminal SSID has not come (step SB9: NO), the terminal device-side control section 20 determines whether or not the timing has come once again. On the other hand, if the terminal device-side control section 20 has determined that the timing to change the first terminal SSID has come (step SB9: YES), the terminal device-side control section 20 changes the first terminal SSID (step SB10).

When the terminal device-side control section 20 changes the first terminal SSID, the terminal device-side control section 20 changes the first terminal SSID in accordance with the same predetermined rule as the rule by which the printer-side control section 10 of the printer 1 changes the first print SSID. For example, if the first print SSID includes the fixed portion KB and the variable portion KHB as illustrated in FIG. 6, and the printer-side control section 10 increments the number of the variable portion KHB by one, the terminal device-side control section 20 changes the first terminal SSID by incrementing the number of the variable portion KHB in the same manner. A description will be given later of the advantages of this.

After the terminal device-side control section 20 changes the first terminal SSID, the terminal device-side control section 20 sets the changed first terminal SSID in the terminal device-side setting file 211 (step SB11). The processing of the terminal device-side control section 20 returns to step SB3, and the terminal device-side control section 20 makes a communication connection with the printer 1 that functions as an access point once again. Here, the printer-side control section 10 has changed the first print SSID, and thus the terminal device 202 goes into a state of not allowed to be connected to the printer 1. When the intensity of the radio wave of the terminal device 201 satisfies a predetermined intensity, and if the changed first terminal SSID matches the first print SSID, it is possible for the terminal device 201 that should have a communication connection with the printer 1 to establish a communication connection with the printer 1.

In this manner, the printer-side control section 10 disconnects the communication connection with the terminal device 201 determined to have been connected by mistake, and changes the first print SSID included in the first connection setting information 112 stored in the printer-side memory 11. If the terminal device-side control section 20 of the terminal device 201 does not establish a communication connection with the printer 1 within a certain period of time, the terminal device-side control section 20 changes the first terminal SSID included in the first connection setting information 112 stored in the terminal device-side memory 21, and attempts a communication connection with the printer 1 in accordance with the changed first terminal SSID.

Thereby, the printer-side control section 10 disconnects the communication connection with the terminal device 202 and changes the first print SSID, and thus it is possible to prevent the terminal device 202 unintended by a user from establishing a communication connection with the printer 1. Also, the terminal device-side control section 20 of the terminal device 201 changes the first terminal SSID in the same manner as the printer 1, and attempts a communication connection with the printer 1 in accordance with the changed first terminal SSID, and thus it is possible for the terminal device 201 to reliably establish a communication connection with the printer 1. Accordingly, it is possible for the communication system 100 to prevent the terminal device 202 unintended by a user from establishing a communication connection with the printer 1, and it is possible for the terminal device 201 that should have a communication connection with the printer 1 to reliably establish a communication connection with the printer 1. Also, the setting operation by the user is unnecessary until the terminal device 201 establishes a communication connection with the printer 1, it is possible to simplify the setting operation of the communication connection.

Also, as described above, the printer-side control section 10 changes the first print SSID that identifies the wireless network N1, whereas the printer-side control section 10 does not change the first print authentication information. Thereby, the terminal device-side control section 20 ought to change only the first terminal SSID when making a communication connection with the printer 1. Accordingly, the printer-side control section 10 does not change the first print authentication information so that in order to establish a communication connection with the printer 1, the terminal device-side control section 20 ought to change only the first terminal SSID, and thus it is possible for the terminal device 201 to rapidly establish a communication connection with the printer 1. Also, it is possible to reduce the processing load of the terminal device-side control section 20.

Also, as described above, when the terminal device-side control section 20 changes the first terminal SSID, the terminal device-side control section 20 changes the first terminal SSID by the same predetermined rule as the predetermined rule by which the printer-side control section 10 changes the first print SSID. For example, regarding first print SSID "AAABBB_123" illustrated in FIG. 6, when the printer-side control section 10 increments the number of the variable portion KHB by one so as to change to "AAABBB_124", the terminal device-side control section 20 increments the number of the variable portion KHB of the first terminal SSID by one in the same manner. Suppose the terminal device-side control section 20 decrements the number of the variable portion KHB by one, "AAABBB_123" illustrated in FIG. 6 is changed to "AAABBB_122". This makes it necessary for the terminal device-side control section 20 to change the first terminal SSID a number of times until that first terminal SSID matches the first print SSID changed by the printer-side control section 10. That is to say, it is not possible for the terminal device 201 to rapidly establish a communication connection with the printer 1 that functions as an access point. Thus, as described in the present embodiment, the terminal device-side control section 20 changes the first terminal SSID in accordance with the same rule as the predetermined rule by which the printer-side control section 10 changes the first print SSID. Thereby, it is possible for the terminal device 201, that is to say, the terminal device 201 that should have a communication connection with the printer 1 to rapidly establish a communication connection with the printer 1.

Also, as described above, if a predetermined period has elapsed from the previous change of the first print SSID, the printer-side control section 10 changes the first print SSID. In the same manner, if a predetermined period has elapsed from the previous change of the first print SSID, the terminal device-side control section 20 changes the first terminal SSID. In the present embodiment, the period for changing the first print SSID by the printer-side control section 10 and the predetermined period of changing the first print SSID by the terminal device-side control section 20 have a relationship as illustrated in FIG. 7.

Figure 7:
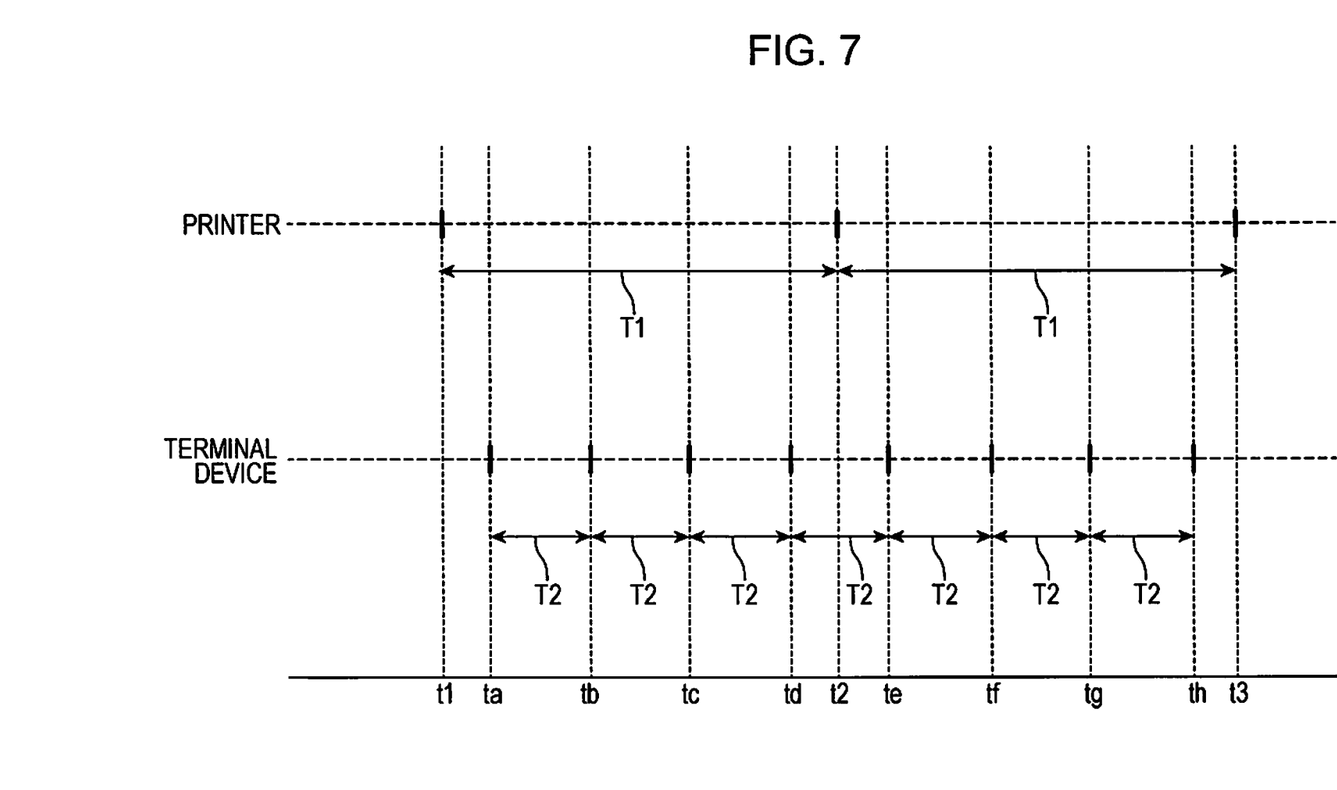
FIG. 7 is a diagram illustrating an example of periods of changing the first SSID.

FIG. 7 is a diagram illustrating an example of periods for changing the first print SSID and the first terminal SSID. The terminal device 200 illustrated in FIG. 7 is the terminal device 201 in which the setting application 212 has started, that is to say, the terminal device 201 that should have a communication connection with the printer 1.

In the example illustrated in FIG. 7, the printer-side control section 10 of the printer 1 changes the first print SSID for each lapse of a period T1. In the example illustrated in FIG. 7, when the printer-side control section 10 does not receive second connection setting information 214 from the terminal device 200 with which a communication connection has been established, the printer-side control section 10 changes the first print SSID at time t1. Also, if the printer-side control section 10 does not receive second connection setting information 214 from the terminal device 200 with which a communication connection has been established during the period T1 from time t1, the printer-side control section 10 changes the first print SSID at time t2 after lapse of the period T1 from time t1. In the same manner, if the printer-side control section 10 does not receive second connection setting information 214 from the terminal device 200 with which a communication connection has been established during the period T1 from time t2, the printer-side control section 10 changes the first print SSID at time t3 after lapse of the period T1 from time t2.

Also, in the example illustrated in FIG. 7, the terminal device-side control section 20 of the terminal device 201 changes the first terminal SSID for each lapse of a period T2. In the example illustrated in FIG. 7, if it is not possible for the terminal device-side control section 20 to establish a communication connection with the printer 1, the terminal device-side control section 20 changes the first terminal SSID at time ta, and after that if it is not possible to establish a communication connection with the printer 1, the terminal device-side control section 20 changes the first terminal SSID for each lapse of the period T2 at time tb, time tc, time td, time te, time tf, time tg and time th.

That is to say, as illustrated in FIG. 7, in the present embodiment, the terminal device-side control section 20 changes the first print SSID at intervals of the period T2, which is shorter than the period T1 for changing the first print SSID by the printer-side control section 10. In this manner, the terminal device-side control section 20 changes the first terminal SSID in the period shorter than the period for changing the first print SSID so as to obtain the following advantages.

That is to say, it is possible for the terminal device 201 that should have a communication connection with the printer 1 to rapidly establish a communication connection with the printer 1. To be more specific, if the period for changing the first terminal SSID here is shorter than the period for changing the first print SSID, even if the terminal device-side control section 20 changes the first terminal SSID, there is a possibility that the printer-side control section 10 has newly changed the first print SSID. For example, it is assumed that the terminal device-side control section 20 has changed the first terminal SSID indicating "AAABBB_123" to "AAABBB_124" at a certain timing. Here, if the printer-side control section 10 changes the first SSID indicating "AAABBB_124" to "AAABBB_125" at a timing earlier than the certain timing, it is not possible for the terminal device-side control section 20 to establish a communication connection with the printer 1 at the certain timing. In this manner, if the terminal device-side control section 20 changes the first terminal SSID in a longer period than the period for changing the first print SSID by the printer-side control section 10, the possibility that the first terminal SSID changed by the terminal device-side control section 20 matches the first print SSID changed by the printer-side control section 10 is reduced. This causes a failure of the terminal device 201 that should have a communication connection with the printer 1 in rapidly establishing a communication connection with the printer 1. Thus, in the present embodiment, as illustrated in FIG. 7, the period T2 for changing the first terminal SSID by the terminal device-side control section 20 is shorter than the period T1 for changing the first print SSID by the printer-side control section 10. Thereby, the possibility that the first terminal SSID changed by the terminal device-side control section 20 matches the first print SSID changed by the printer-side control section 10 is increased, and thus it is possible for the terminal device 201 that should have a communication connection with the printer 1 to rapidly establish a communication connection with the printer 1.

In this regard, the period for changing the first terminal SSID by the terminal device-side control section 20 is configured to be settable by the setting section 24. Accordingly, for example, it becomes possible for the setting section 24 to set the period for changing the first terminal SSID by the terminal device-side control section 20 to a period that is further shorter than the period T2. In this case, it becomes possible for the terminal device 201 that should have a communication connection with the printer 1 to establish a communication connection with the printer 1. From this, it is possible for the setting section 24 to set the period for changing the first terminal SSID by the terminal device-side control section 20, and thus to change to a period desired by a user. Accordingly, the user's convenience at the time when the terminal device 201 that should have a communication connection establishes a communication connection with the printer 1 is improved.

Referring back to the flowchart illustrated in FIG. 5, if the terminal device-side control section 20 of the terminal device 201 determines that a communication connection has been established with the printer 1 (step SB5: YES), the terminal device-side control section 20 transmits the second connection setting information to the printer 1 (step SB6).

Referring back to the flowchart illustrated in FIG. 4, if the printer-side control section 10 determines in step SA9 that the second connection setting information has been received (step SA9: YES), the printer-side control section 10 establishes a communication connection with the access point AP in accordance with the received second connection setting information (step SA15). That is to say, the printer-side control section 10 changes the operation mode of the printer side communication unit 14 to the second print communication mode, sets the second SSID and the second authentication information in the printer-side setting file 111, and establishes a communication connection with the access point AP.

As described above, the printer 1 (printer) includes the printer-side memory 11 (memory) that stores the first connection setting information 112 for establishing a communication connection with one or a plurality of terminal devices 200, and the printer-side control section 10 (control section) that establishes a communication connection with the access point AP in accordance with the second connection setting information 214 for establishing a communication connection with the access point AP (external device) received from the terminal device 200 that has a communication connection. In a predetermined case, the printer-side control section 10 determines that the terminal device 200 that has made a communication connection to be a terminal device connected by mistake, disconnects the communication connection with the terminal device 200, and changes the first connection setting information 112 stored in the printer-side memory 11.

The printer-side control section 10 disconnects the communication connection with the terminal device 202, and changes the first print SSID, and thus it is possible to prevent the terminal device 200 unintended by the user from establishing a communication connection with the printer 1. For example, when setting a communication connection to the access point AP for the printer 1, if the terminal device 202 is a terminal device unintended by a user, it is possible for the printer-side control section 10 to prevent the terminal device 202 from establishing a communication connection to the printer 1.

Also, if the printer-side control section 10 does not receive the second connection setting information 214 from the terminal device 200 that has established a communication connection within a certain period of time, the printer-side control section 10 determines the terminal device 200 that has a communication connection to be a terminal device that has been connected by mistake, disconnects the communication connection with the terminal device 200, and changes the first connection setting information 112 stored in the printer-side memory 11.

As described above, in the present embodiment, the terminal device 200 in which the setting application 212 has been started transmits the second connection setting information 214 to the printer 1. That is to say, the terminal device 200 unintended by a user has not started the setting application 212. Accordingly, when the printer-side control section 10 sets a communication connection to the access point AP for the printer 1, it is possible to prevent the terminal device 200 in which the setting application 212 has not been started from establishing a communication connection with the printer 1. For example, when setting a communication connection to the access point AP for the printer 1, if the terminal device 202 is a terminal device unintended by the user, it is possible for the printer-side control section 10 to prevent the terminal device 202 from establishing a communication connection with the printer 1.

Also, the first connection setting information 112 includes the first SSID (identification information) of the wireless network N1, which is formed by the fixed portion KB and the variable portion KHB. The printer-side control section 10 then changes the variable portion KHB of the first print SSID in accordance with the predetermined rule.

Thereby, the printer-side control section 10 changes the variable portion KHB out of the fixed portion KB and the variable portion KHB that constitute the first print SSID in accordance with the predetermined rule, and thus it is possible to easily change the first connection setting information 112 and to prevent a communication connection with the terminal device 200 unintended by the user.

Also, the first connection setting information 112 includes the first authentication information (authentication information) for connecting to the wireless network N1. The printer-side control section 10 does not change the first authentication information.

Thereby, when the terminal device-side control section 20 makes a communication connection with the printer 1, the terminal device-side control section 20 ought to change only the first terminal SSID. Accordingly, since the printer-side control section 10 does not change the first authentication information, the terminal device-side control section 20 ought to change only the first terminal SSID in order to make a communication connection with the printer 1. Accordingly, it is possible for the terminal device 200 that should have a communication connection with printer 1 to rapidly establish a communication connection with the printer 1.

Also, if the intensity of the radio wave received from the terminal device 200 satisfies the predetermined intensity, the printer-side control section 10 establishes a communication connection with the terminal device 200, whereas if the intensity of the radio wave received from the terminal device 200 does not satisfy the predetermined intensity, the printer-side control section 10 does not establish a communication connection with the terminal device 200.

In this manner, the printer-side control section 10 makes a communication connection with the terminal device 200 in accordance with the intensity of the radio wave of the terminal device 200, and thus it is possible to more reliably prevent the terminal device 200 unintended by a user from establishing a communication connection with the printer 1.

Also, the communication system 100 includes the access point AP, the printer 1, and a plurality of terminal devices 200. The printer 1 includes the printer-side memory 11 and the printer-side control section 10. In a predetermined case, the printer-side control section 10 determines that the terminal device 200 having a communication connection to be a terminal device that has been connected by mistake, disconnects the communication connection with the terminal device 200, and changes the first connection setting information 112 stored in the printer-side memory 11. The terminal device 200 includes the terminal device-side memory 21 that stores the first connection setting information 213 and the second connection setting information 214, and the terminal device-side control section 20 that changes the first connection setting information 213 stored in the terminal device-side memory 21 if a communication connection is not established with the printer 1 within a certain period of time and establishes a communication connection with the printer 1 in accordance with the changed first connection setting information 213.

Here, it is assumed that the terminal device 201 is a terminal device that should have a communication connection with the printer 1, and the terminal device 202 is a terminal device unintended by the user. Thereby, in the communication system 100, the printer-side control section 10 disconnects the communication connection with the terminal device 202, changes the first print SSID, and thus it is possible to prevent the terminal device 202 unintended by the user from establishing a communication connection with the printer 1. Also, in the communication system 100, the terminal device-side control section 20 of the terminal device 201 changes the first terminal SSID in the same manner as the printer 1, and attempts a communication connection with the printer 1 in accordance with the changed first terminal SSID. Accordingly, it is possible for the terminal device 201 to reliably establish a communication connection with the printer 1. Accordingly, it is possible for the communication system 100 to prevent the terminal device 202 unintended by the user from establishing a communication connection with the printer 1, and allows the terminal device 201 that should have a communication connection with the printer 1 to reliably establish a communication connection with the printer 1. Also, a user's setting operation is unnecessary until the terminal device 201 establishes a communication connection with the printer 1, and thus it is possible to easily perform the setting operation of the communication connection.

Also, the terminal device-side control section 20 changes the first connection setting information 213 stored in the terminal device-side memory 21 in the period shorter that the period for changing the first connection setting information 112 by the printer-side control section 10. More specifically, the terminal device-side control section 20 changes the first terminal SSID stored in the terminal device-side memory 21 in the period shorter than the period in which the printer-side control section 10 changes the first print SSID.

Thereby, the possibility that the first terminal SSID changed by the terminal device-side control section 20 matches the first print SSID changed by the printer-side control section 10 increases, and thus it is possible for the terminal device 200 that should have a communication connection with the printer 1 to rapidly establish a communication connection with the printer 1.

Also, the terminal device 200 includes the setting section 24 that sets the period for changing the first connection setting information 213. More specifically, the setting section 24 sets the period for changing the first terminal SSID.

Thereby, the period for changing the first terminal SSID by the terminal device-side control section 20 is settable by the setting section 24, and thus it is possible to change the period to the period desired by the user. Accordingly, the user's convenience at the time when the terminal device 200 that should have a communication connection establishes a communication connection with the printer 1 improves.

Also, the terminal device-side control section 20 changes the variable portion KHB of the first terminal SSID in accordance with the same predetermined rule as the rule by which the printer-side control section 10 changes.

In this manner, the terminal device-side control section 20 changes the variable portion KHB of the first terminal SSID in accordance with the same predetermined rule as the printer-side control section 10, and thus it is possible for the terminal device 200 that should have a communication connection with the printer 1 to rapidly establish a communication connection with the printer 1.

In this regard, the embodiment described above is only one mode of the invention, and any variations and applications are possible within the scope of the invention.

For example, in the embodiment described above, as a predetermined rule for changing the first print SSID by the printer-side control section 10, the case where the number of the variable portion KHB is incremented by one is exemplified. However, the predetermined rule is not limited to the rule described above. For example, a rule of incrementing the number of the variable portion KHB by two may be employed, or a rule of decrementing the number of the variable portion KHB by a predetermined number may be employed.

Also, for example, when the control method (printer control method) of the printer 1 described above is realized by a computer included in the printer 1, it is possible to configure the invention by a program causing the computer to perform the control method described above, or a recording medium on which the program is recorded in a readable manner by the computer, or in the mode of a transmission medium transmitting the program. As the recording medium described above, it is possible to use a magnetic or optical recording medium, or a semiconductor memory device. Specifically, a portable or stationary type recording medium, such as a flexible disk, an HDD (Hard disk Drive), a CD-ROM (Compact Disk Read Only Memory), a DVD (Digital Versatile Disk), a Blu-ray (registered trademark) disc, a magneto-optical disc, a flash memory, a card type recording medium, or the like may be provided. Also, the recording medium described above may be a nonvolatile storage device, such as a RAM (Random Access Memory), a ROM (Read Only Memory), an HDD, or the like, which is an internal storage device of the printer 1.

Also, for example, each processing unit in FIG. 4 and FIG. 5 is obtained by dividing the entire processing in accordance with the main processing contents in order to make it easy to understand the processing of the printer 1 and the terminal device 200 (the terminal device 201 in the present embodiment), and thus the invention is not limited by the dividing method and the name of the processing unit. The processing of the printer 1 and the terminal device 200 may be further divided into many processing units in accordance with the processing contents. Also, one processing unit may be divided so as to further include many processing units.

Also, each functional section illustrated in FIG. 2 and FIG. 3 indicates a functional configuration, and the specific implementation is not limited in particular. That is to say, it is not always necessary to implement hardware corresponding to each functional section separately. It is possible to realize the functions of a plurality of functional sections by executing a program by one processor as a matter of course. Also, a part of the functions realized by software in the embodiment described above may be performed by hardware. Alternatively, a part of the functions realized by hardware may be performed by software. In addition, it is possible to change the specific detailed configuration of each of the other sections of the printer 1 and the terminal device 200 in any way without departing from the sprit and scope of the invention.

Also, for example, in the embodiment described above, the printer 1 was exemplified as a thermal printer including a thermal head. However, the invention is not limited to this. For example, it is possible to apply the invention to the case where the printer 1 is another printer, such as an ink jet printer, a dot impact printer, or the like.

The entire disclosure of Japanese Patent Application No. 2017-17609, filed Feb. 2, 2007 is expressly incorporated by reference herein.

What is claimed is:

1. A printer comprising:
    a memory configured to store first connection setting information for establishing a communication connection with a plurality of terminal devices including at least a first terminal device and a second terminal device different from the first terminal device; and
    in accordance with second connection setting information for establishing a communication connection with an external device received from the first terminal device with which the communication connection with the printer has been established, a processor configured to establish the communication connection with the external device,
    wherein when the processor determines the second terminal device having the communication connection with the printer to be a terminal device connected by mistake, the processor disconnects the communication connection with the second terminal device, and changes the first connection setting information stored in the memory in accordance with a same predetermined rule in accordance with which the first terminal device changes the first connection information.

2. The printer according to claim 1,
    wherein when the processor does not receive the second connection setting information from the second terminal device with which the communication connection with the printer has been established within a certain period of time, the processor determines the second terminal device having the communication connection with the printer to be the terminal device connected by mistake, disconnects the communication connection with the second terminal device, and changes the first connection setting information stored in the memory.

3. The printer according to claim 1,
    wherein the first connection setting information includes identification information of a network, the identification information including a fixed portion and a variable portion, and
    the processor changes the variable portion in accordance with the same predetermined rule.

4. The printer according to claim 3,
    wherein the first connection setting information includes authentication information for connecting to the network, and the processor does not change the authentication information.

5. The printer according to claim 1,
wherein if an intensity of a radio wave received from the terminal device satisfies a predetermined intensity, the processor establishes a communication connection with the terminal devices, whereas if the intensity of the radio wave received from the terminal devices does not satisfy the predetermined intensity, the processor does not establish a communication connection with the terminal devices.

6. A method of controlling a printer, the method comprising:
storing first connection setting information for establishing a communication connection with a plurality of terminal devices including at least a first terminal device and a second terminal device different from the first terminal device,
in accordance with second connection setting information for establishing a communication connection with an external device received from the first terminal device with which the communication connection with the printer has been established, establishing the communication connection with the external device; and
in a predetermined case, determining the second terminal device having the communication connection with the printer to be a terminal device connected by mistake, disconnecting the communication connection with the second terminal device, and changing the first connection setting information stored in the memory in accordance with a same predetermined rule in accordance with which the first terminal device changes the first connection information.

7. A communication system including an external device, a printer, and a plurality of terminal devices, the communication system comprising:
the printer including a printer-side memory configured to store first connection setting information for establishing a communication connection with one or a plurality of terminal devices; and
in accordance with second connection setting information for establishing a communication connection with the external device received from the terminal device with which a communication connection has been established, a printer-side processor configured to establish a communication connection with the external device,
wherein in a predetermined case, the printer-side processor determines the terminal device having a communication connection to be the terminal device connected by mistake, disconnects the communication connection with the terminal device, and changes the first connection setting information stored in the memory in accordance with a predetermined rule,
each of the terminal devices including
a terminal device-side memory configured to store the first connection setting information and the second connection setting information, and
when a communication connection with the printer is not established within a certain period of time, a terminal device-side processor configured to change the first connection setting information stored in the terminal device-side memory in accordance with the predetermined rule that is the same as the predetermined rule of the printer-side processor, and to establish a communication connection with the printer in accordance with the changed first connection setting information.

8. The communication system according to claim 7,
wherein the terminal device-side processor changes the first connection setting information stored in the terminal device-side memory in a shorter period than a period in which the printer-side processor changes the first connection setting information.

9. The communication system according to claim 8,
wherein each of the terminal devices includes a setting section for setting a period for changing the first connection setting information.

10. The communication system according to claim 7,
wherein the first connection setting information includes identification information of a network including a fixed portion and a variable portion,
the printer-side processor changes the variable portion in accordance with a predetermined rule, and
the terminal device-side processor changes the variable portion in accordance with the same predetermined rule as that of the printer-side processor.

* * * * *